US012565265B2

(12) United States Patent (10) Patent No.: US 12,565,265 B2
Teramachi (45) Date of Patent: Mar. 3, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Tomotaka Teramachi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 18/589,482

(22) Filed: Feb. 28, 2024

(65) Prior Publication Data

US 2024/0308587 A1 Sep. 19, 2024

(30) Foreign Application Priority Data

Mar. 15, 2023 (JP) ................................. 2023-040954

(51) Int. Cl.
| *B62D 15/02* | (2006.01) |
| *B60W 30/18* | (2012.01) |
| *G06V 20/58* | (2022.01) |
| *G08G 1/16* | (2006.01) |

(52) U.S. Cl.
CPC ... *B62D 15/0255* (2013.01); *B60W 30/18163* (2013.01); *G06V 20/58* (2022.01); *G08G 1/167* (2013.01)

(58) Field of Classification Search
CPC ........ B62D 15/0255; B60W 30/18163; B60W 50/14; B60W 60/001; G06V 20/58; G08G 1/167
USPC ............................................................ 701/41
See application file for complete search history.

(56) References Cited

FOREIGN PATENT DOCUMENTS

| JP | 2017-100534 | | 6/2017 |
| JP | 2021-138243 | | 9/2021 |
| JP | 2022-090190 | | 6/2022 |
| JP | 2022090190 A | * | 6/2022 |

OTHER PUBLICATIONS

Japanese Office Action for Japanese Patent Application No. 2023-040954 mailed Dec. 3, 2024.

* cited by examiner

*Primary Examiner* — Maceeh Anwari
(74) *Attorney, Agent, or Firm* — Amin, Turocy & Watson, LLP

(57) ABSTRACT
A vehicle control device recognizes a surrounding situation of a host vehicle, causes the host vehicle to make a lane change from a first lane in which the host vehicle is traveling to a second lane adjacent to the first lane by controlling steering of the host vehicle on the basis of the surrounding situation, executes the lane change when no vehicle is present on a target road shoulder in a direction of the lane change and adjacent to the second lane when the lane change is scheduled, and curbs the lane change when a vehicle is present on the road shoulder.

11 Claims, 13 Drawing Sheets

HOST VEHICLE

DIFFERENT VEHICLE

TRAJECTORY IN FUTURE

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-040954, filed Mar. 15, 2023, the content of which is incorporated herein by reference.

BACKGROUND

Field of the Invention

The present invention relates to a vehicle control device, a vehicle control method, and a storage medium.

Description of Related Art

In recent years, efforts to provide sustainable transportation systems taking various situations into account have become active. In order to realize this goal, the efforts are focused on research and development for further improvement in traffic safety and convenience through research and development related to driving support technology. In the related art, a control device that controls lane change behavior on the basis of a surrounding situation of a vehicle was disclosed (Japanese Unexamined Patent Application, First Publication No. 2017-100534 and Japanese Unexamined Patent Application, First Publication No. 2021-138243).

SUMMARY

In control devices in the related art, an occupant is not sufficiently taken into account.

The present invention has been made in consideration of such circumstances, and an object thereof is to provide a vehicle control device capable of realizing vehicle control taking an occupant into account, a vehicle control method, and a storage medium, which ultimately contributes to development of sustainable transportation systems taking an occupant into account.

A vehicle control device, a vehicle control method, and a storage medium according to this invention employ the following constitutions.

(1): According to an aspect of this invention, a vehicle control device includes a storage medium storing computer-readable instructions, and at least one processor connected to the storage medium. The processor executes the computer-readable instructions to: recognize a surrounding situation of a host vehicle; cause the host vehicle to make a lane change from a first lane in which the host vehicle is traveling to a second lane adjacent to the first lane by controlling steering of the host vehicle on the basis of the surrounding situation; execute the lane change when no vehicle is present on a target road shoulder in a direction of the lane change and adjacent to the second lane when the lane change is scheduled; and curb the lane change when a vehicle is present on the road shoulder.

(2): According to the aspect of the foregoing (1), the processor executes the computer-readable instructions to: not execute the lane change when the vehicle is at a stop on the target road shoulder.

(3): According to the aspect of the foregoing (1), the processor executes the computer-readable instructions to: not execute the lane change when a vehicle traveling on the target road shoulder is present.

(4): According to the aspect of the foregoing (1), the processor executes the computer-readable instructions to: curb a lane change to the second lane based on a first plan when the vehicle is present on the target road shoulder. The target road shoulder is a region on a road shoulder adjacent to the second lane in a target section. The target section is a section in a proceeding direction of the host vehicle where the host vehicle is positioned for a time period from a first time at which a lane change is in progress to a second time at which the lane change ends when it is assumed that the host vehicle has executed the lane change on the basis of the first plan.

(5): According to the aspect of the foregoing (1), the processor executes the computer-readable instructions to: curb a lane change to the second lane based on a first plan when it is assumed that a vehicle traveling on the road shoulder is present and the vehicle traveling on a target road shoulder during a target time period is present. The target road shoulder is a region on a road shoulder adjacent to the second lane in a target section. The target section is a section in a proceeding direction of the vehicle where the host vehicle is positioned during a target time period from a first time at which a lane change is in progress to a second time at which the lane change ends when it is assumed that the host vehicle has executed the lane change on the basis of the first plan.

(6): According to the aspect of the foregoing (1), the processor executes the computer-readable instructions to: execute a lane change after passing a vehicle on the road shoulder when a vehicle is present on the road shoulder.

(7): According to the aspect of the foregoing (6), the processor executes the computer-readable instructions to: notify an occupant of the host vehicle of a lane change to be made via a notification device before passing a vehicle on the road shoulder.

(8): According to the aspect of the foregoing (6), the processor executes the computer-readable instructions to: cause a direction indicator to display a lane change to be made to the second lane before passing a vehicle on the road shoulder.

(9): According to the aspect of the foregoing (8), the processor executes the computer-readable instructions to: execute the lane change after notifying an occupant of the host vehicle of the lane change to be made via a notification device; and curb the lane change when a vehicle is present on a road shoulder adjacent to the second lane in a target section. The target section is a section in a proceeding direction of the host vehicle from a position of the host vehicle at a third time at which the notification is scheduled to a position of the host vehicle at a fourth time at which the lane change is scheduled to be completed.

(10): According to the aspect of the foregoing (1), the processor executes the computer-readable instructions to: execute the lane change after causing a direction indicator to display a lane change to be made to the second lane; and curb the lane change when a vehicle is present on a road shoulder adjacent to the second lane in a target section. The target section is a section in a proceeding direction of the host vehicle from a position of the host vehicle at a fifth time at which the direction indicator is scheduled to be caused to display a lane change to be made to the second lane to a position of the host vehicle at a sixth time at which the lane change is scheduled to be completed.

(11): According to the aspect of the foregoing (1), the processor executes the computer-readable instructions to: curb the lane change when the lane change is scheduled to be executed and a vehicle is present on a road shoulder adjacent to the second lane in a target section. The target section is a section in a proceeding direction of the host vehicle from a position of the host vehicle at a seventh time at which the host vehicle is scheduled to come into contact with a division line of the second lane in the schedule to a position of the host vehicle at an eighth time at which the lane change is scheduled to be completed.

(12): According to another aspect of the present invention, a vehicle control method in which a computer executes processing of recognizing a surrounding situation of a host vehicle, processing of causing the host vehicle to make a lane change from a first lane in which the host vehicle is traveling to a second lane adjacent to the first lane by controlling steering of the host vehicle on the basis of the surrounding situation, processing of executing the lane change when no vehicle is present on a target road shoulder in a direction of the lane change and adjacent to the second lane when the lane change is scheduled, and processing of curbing the lane change when a vehicle is present on the road shoulder.

(13): According to another aspect of the present invention, a non-transitory computer storage medium stores a program for causing a computer to execute processing of recognizing a surrounding situation of a host vehicle, processing of causing the host vehicle to make a lane change from a first lane in which the host vehicle is traveling to a second lane adjacent to the first lane by controlling steering of the host vehicle on the basis of the surrounding situation, processing of executing the lane change when no vehicle is present on a target road shoulder in a direction of the lane change and adjacent to the second lane when the lane change is scheduled, and processing of curbing the lane change when a vehicle is present on the road shoulder.

According to the aspects of (1) to (13), it is possible to realize vehicle control taking an occupant into account. For example, since the vehicle control device prevents the host vehicle from making a behavior such as a movement toward a vehicle present on a road shoulder, a lane change can be made without causing an occupant to feel uneasy.

According to the aspect of (3), since the vehicle control device prevents the host vehicle from making a behavior such as a movement toward a vehicle traveling in a road shoulder, such as a vehicle traveling along in a road shoulder, a lane change can be made without causing an occupant to feel uneasy.

According to the aspect of (6), since the vehicle control device causes the host vehicle to make a lane change after passing vehicles on a road shoulder, a lane change can be made without causing an occupant to feel uneasy.

According to the aspect of (7), since the vehicle control device causes the notification device to notify an occupant of a lane change timing or causes the direction indicator to display it, the occupant's feeling of security is improved. For example, a lane change is notified or is displayed by the direction indicator before passing a road shoulder, and thereafter (for example, at a timing passing a road shoulder), it is easy for an occupant to be able to recognize that a lane change will start.

According to any one of the aspects of (8) to (10), the vehicle control device can accurately judge a vehicle on a road shoulder having a probability of causing an occupant to feel uneasy when a lane change is made. Accordingly, the vehicle control device can make a lane change more reliably without causing an occupant to feel uneasy.

BRIEF DESCRIPTION OF THE DRAWINGS

FIG. 4 is a view showing an example when a first point is a location for a timing for a direction indicator to be turned on.

DETAILED DESCRIPTION OF THE INVENTION

Hereinafter, with reference to the drawings, embodiments of a vehicle control device, a vehicle control method, and a storage medium of the present invention will be described.

First Embodiment

[Overall Constitution]

Figure 1:
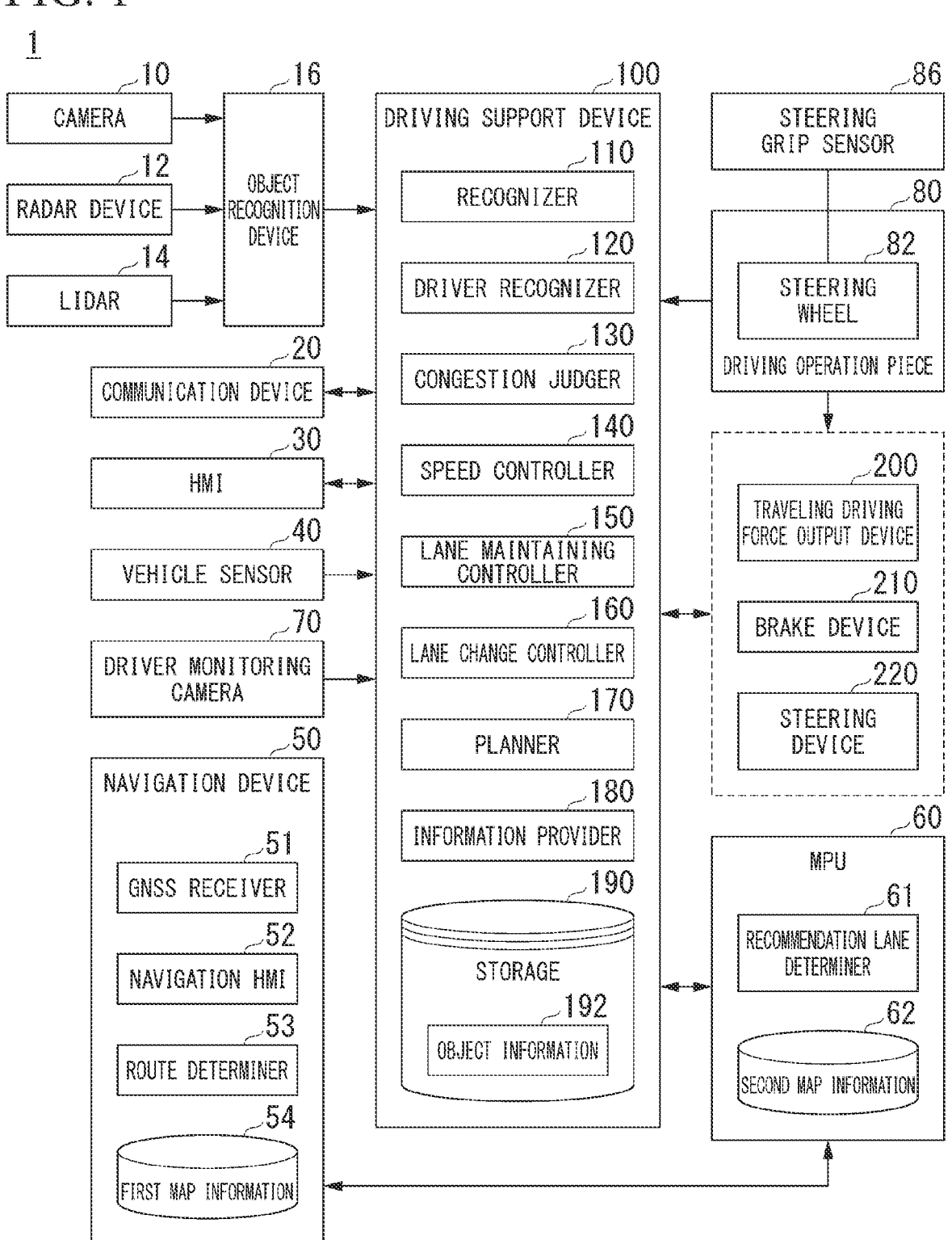
FIG. 1 is a view of a constitution of a vehicle system utilizing a vehicle control system according to an embodiment.

FIG. 1 is a view of a constitution of a vehicle system 1 utilizing a vehicle control system according to an embodiment. A vehicle having the vehicle system 1 mounted therein is a vehicle, for example, with two wheels, three wheels, four wheels, or the like, and a drive source thereof is an internal-combustion engine such as a diesel engine or a gasoline engine, an electric motor, or a combination of these. An electric motor is operated using generated power by a generator connected to an internal-combustion engine, or discharge power of a secondary battery or a fuel cell.

For example, the vehicle system 1 includes a camera 10, a radar device 12, a light detection and ranging (LIDAR) 14, an object recognition device 16, a communication device 20, a human machine interface (HMI) 30, a vehicle sensor 40, a navigation device 50, an MPU 60, a driver monitoring camera 70, a driving operation piece 80, a driving support device 100, a traveling driving force output device 200, a brake device 210, and a steering device 220. These devices and instruments are connected to each other by a multiplex communication line such as a controller area network (CAN) communication line, a serial communication line, a wireless communication network, or the like. The constituents shown in FIG. 1 are merely an example. Some of the constituents may be omitted, and other constituents may further be added thereto. The driving support device 100 is an example of "a vehicle control device".

For example, the camera 10 is a digital camera utilizing a solid-state image capturing element such as a charge coupled device (CCD) or a complementary metal oxide semiconductor (CMOS). The camera 10 is attached to an arbitrary location in a vehicle having the vehicle system 1 mounted therein (hereinafter, a host vehicle M). When images of the side in front are captured, the camera 10 is attached to an upper part of a front windshield, a rear surface of a rearview mirror, or the like. For example, the camera 10 captures images around the host vehicle M periodically and repeatedly. The camera 10 may be a stereo camera.

The radar device 12 radiates radio waves such as millimeter waves around the host vehicle M and detects at least a position (distance and azimuth) of an object by detecting radio waves (reflected waves) reflected by the object. The radar device 12 is attached to an arbitrary location in the host vehicle M. The radar device 12 may detect the position and the speed of an object by a frequency modulated continuous wave (FM-CW) method.

The LIDAR 14 emits light (or electromagnetic waves having wavelengths close to that of light) around the host vehicle M and measures scattered light. The LIDAR 14 detects the distance to a target on the basis of the time from light emission to light reception. For example, emitted light is pulsed laser light. The LIDAR 14 is attached to an arbitrary location in the host vehicle M.

The object recognition device 16 recognizes the position, the kind, the speed, and the like of an object by performing sensor fusion processing with respect to detection results of some or all of the camera 10, the radar device 12, and the LIDAR 14. The object recognition device 16 outputs recognition results to the driving support device 100. The object recognition device 16 may output the detection results of the camera 10, the radar device 12, and the LIDAR 14 to the driving support device 100 without any change. The object recognition device 16 may be omitted from the vehicle system 1.

For example, the communication device 20 communicates with different vehicles present around the host vehicle M utilizing a cellular network, a Wi-Fi network, Bluetooth (registered trademark), dedicated short range communication (DSRC), or the like or communicates with various server devices via a wireless base station.

The HMI 30 provides various information to an occupant of the host vehicle M and receives an input operation of the occupant. The HMI 30 includes various display devices, a speaker, a buzzer, a touch panel, a switch, a key, and the like. The HMI 30 includes a display device. For example, the display device (display) is a display device that is a so-called multi-information display provided in a central part of an instrument panel of the host vehicle M and displays various information on the host vehicle M, such as a speed indicator (speedometer) showing a traveling speed of the host vehicle M or a rotational speed indicator (tachometer) showing a rotational frequency (rotational speed) of an internal-combustion engine provided in the host vehicle M. The HMI 30 and a navigation HMI 52 (which will be described below) are examples of notification devices.

The vehicle sensor 40 includes a vehicle speed sensor for detecting a speed of the host vehicle M, an acceleration sensor for detecting an acceleration, a yaw rate sensor for detecting an angular speed around a vertical shaft, an azimuth sensor for detecting a direction of the host vehicle M, and the like.

For example, the navigation device 50 includes a global navigation satellite system (GNSS) receiver 51, the navigation HMI 52, and a route determiner 53. In the navigation device 50, first map information 54 is retained in a storage device such as a hard disk drive (HDD) or a flash memory. The GNSS receiver 51 identifies the position of the host vehicle M on the basis of a signal received from a GNSS satellite. The position of the host vehicle M may be identified or complemented by an inertial navigation system (INS) utilizing an output of the vehicle sensor 40. The navigation HMI 52 includes a display device, a speaker, a touch panel, a key, and the like. A part or all of the navigation HMI 52 may be shared by the HMI 30 described above. For example, the route determiner 53 determines a route from the position of the host vehicle M identified by the GNSS receiver 51 (or an arbitrary input position) to a destination input by an occupant (hereinafter, a route on a map) using the navigation HMI 52 with reference to the first map information 54. For example, the first map information 54 is information in which road shapes are expressed by links indicating roads and nodes connected by the links. The first map information 54 may include curvatures of roads, point-of-interest (POI) information, and the like. The route on the map is output to the MPU 60. The navigation device 50 may perform route guide using the navigation HMI 52 on the basis of the route on the map. For example, the navigation device 50 may be realized by a function of a terminal device such as a smartphone or a tablet terminal possessed by an occupant. The navigation device 50 may transmit a current position and a destination to a navigation server via the communication device 20 and may acquire a route equivalent to the route on the map from the navigation server.

For example, the MPU 60 includes a recommendation lane determiner 61 and retains second map information 62 in a storage device such as an HDD or a flash memory. The recommendation lane determiner 61 divides the route on the map provided from the navigation device 50 into a plurality of blocks (for example, divides it into blocks of 100 [m] in a vehicle proceeding direction) and determines a recommendation lane for each block with reference to the second map information 62. The recommendation lane determiner 61 determines which lane from the left the vehicle should travel. When a branch point is present in the route on the map, the recommendation lane determiner 61 determines a recommendation lane such that the host vehicle M can travel along a reasonable route to proceed to a branch destination.

The second map information 62 is map information that is more accurate than the first map information 54. For example, the second map information 62 includes information of a central part of a lane, information of a boundary of a lane, and the like. The second map information 62 may include road information, traffic regulation information, address information (address and postal code), facility information, telephone number information, and the like. The second map information 62 may be updated at any time by the communication device 20 communicating with other devices.

For example, the driver monitoring camera 70 is a digital camera utilizing a solid-state image capturing element such as a CCD or a CMOS. The driver monitoring camera 70 is attached to an arbitrary location in the host vehicle M in a position and a direction in which images of the head of an occupant seated in a driver's seat (hereinafter, a driver) of the host vehicle M can be captured from the front (in a direction in which images of the face are captured). For example, the driver monitoring camera 70 is attached to the upper part of the display device provided in the central part of the instrument panel of the host vehicle M. The driver monitoring camera 70 outputs images inside a cabin including the driver of the host vehicle M captured from the disposed position to the driving support device 100.

For example, in addition to a steering wheel 82, the driving operation piece 80 includes an operation switch of a direction indicator, an accelerator pedal, a brake pedal, a shift lever, and other operation pieces. A sensor for detecting an operation amount or the presence or absence of an operation is attached to the driving operation piece 80, and detection results thereof are output to some or all of the driving support device 100, the traveling driving force output device 200, the brake device 210, and the steering device 220. The steering wheel 82 does not always have an annular shape and may be in a form of a deformed steering wheel, a joystick, a button, or the like. A steering grip sensor 86 is attached to the steering wheel 82.

For example, the steering grip sensor 86 is realized by an electrostatic capacity sensor, a piezoelectric element, or the like. The steering grip sensor 86 detects whether or not the driver is in a state of gripping the steering wheel 82. Gripping denotes a state in which the driver is gripping the steering wheel, a state in which hands are in contact with the steering wheel and a force equal to or greater than a predetermined degree is applied to the steering wheel, or the like.

The steering grip sensor 86 may detect gripping on the basis of images captured by the camera or may detect gripping using an optical technique such as a radar device (a technique not requiring contact with the sensor).

For example, the driving support device 100 includes a recognizer 110, a driver recognizer 120, a judgment processor 130, a speed controller 140, a lane maintaining controller 150, a lane change controller 160, a planner 170, an information provider 180, and a storage 190. For example, some or all of these functions are realized by a hardware processor such as a central processing unit (CPU) executing a program (software). Some or all of these constituent elements may be realized by hardware (a circuit; including circuitry) such as a large scale integration (LSI), an application specific integrated circuit (ASIC), a field-programmable gate array (FPGA), or a graphics processing unit (GPU), or may be realized by software and hardware in cooperation. A program may be stored in a storage device such as an HDD or a flash memory (a storage device including a non-transitory storage medium) of the driving support device 100 in advance or may be stored in an attachable/detachable storage medium such as a DVD or a CD-ROM such that the program is installed in the HDD or the flash memory of the driving support device 100 when the storage medium (non-transitory storage medium) is mounted in a drive device. A functional constituent in which at least the judgment processor 130 and the lane change controller 160 are combined is an example of "a controller".

For example, the storage 190 is realized by an HDD, a flash memory, an electrically erasable programmable read only memory (EEPROM), a read only memory (ROM), a random access memory (RAM), or the like. For example, object information 192 is stored in the storage 190. For example, the object information 192 is information in which the position of an object, the attribute of the object, the degree of reliability in recognition of the object, and the like are associated with identification information of the object recognized by the recognizer 110. The driving support device 100 can recognize characteristics of an object with reference to the object information 192. For example, the driving support device 100 can recognize that an object is present in a road shoulder region on a road, the attribute of an object is vehicle, and the degree of reliability in recognition of an object is equal to or higher than a threshold. A degree of reliability in recognition of an object denotes that the score of the degree of reliability derived by the recognizer 110 on the basis of a predetermined algorithm, model, or the like set in advance is equal to or higher than the threshold.

The recognizer 110 recognizes a state of an object around the host vehicle M, such as a position, a speed, and an acceleration, on the basis of information input from the camera 10, the radar device 12, and the LIDAR 14 via the object recognition device 16. For example, the position of an object is recognized as a position on absolute coordinates with an origin at a representative point (a centroid, a drive shaft center, or the like) in the host vehicle M and is used for control. The position of an object may be indicated by a representative point such as a centroid or a corner of the object or may be indicated as a region. A "state" of an object may include an acceleration or a jerk of an object or "an action state" (for example, whether or not it is making a lane change or it is attempting a lane change).

For example, the recognizer 110 recognizes a lane in which the host vehicle M is traveling (traveling lane). For example, the recognizer 110 recognizes the traveling lane by comparing patterns (for example, arrays of solid lines and dotted lines) of road division lines obtained from the second map information 62 and patterns of road division lines around the host vehicle M recognized from images captured by the camera 10. The recognizer 110 may recognize the traveling lane by recognizing traveling path boundaries (road boundaries) including road division lines, road shoulders, curbstones, median strips, guardrails, and the like without being limited to road division lines. In this recognition, a position of the host vehicle M acquired from the navigation device 50 or processing results of the INS may be added. The recognizer 110 recognizes stop lines, obstacles, red lights, toll gates, and other road events.

When recognizing the traveling lane, the recognizer 110 recognizes a position or a posture of the host vehicle M with respect to the traveling lane. For example, the recognizer 110 may recognize a deviation of a reference point in the host vehicle M from the center of the lane and an angle formed with respect to a line of the centers of the lane of the host vehicle M in a proceeding direction as a relative position and a posture of the host vehicle M with respect to the traveling lane. Instead, the recognizer 110 may recognize a position or the like of a reference point in the host vehicle M with respect to any side end part (a road division line or a road boundary) of the traveling lane as a relative position of the host vehicle M with respect to the traveling lane.

The driver recognizer 120 detects whether or not the driver is in a predetermined state on the basis of images captured by the driver monitoring camera 70. A predetermined state denotes a state in which hands-off lane maintaining control (which will be described below) can be executed. A hands-off state denotes a state in which the driver is not gripping the steering wheel, and a hands-on state denotes a state in which the driver is gripping the steering wheel. A state in which the hands-off lane maintaining control can be executed denotes a state in which the driver is monitoring the front (or around the host vehicle M). For example, monitoring the front denotes a state in which the driver is monitoring the front such that the driver can quickly take over from control of the host vehicle M by the vehicle system 1 to an operation of the host vehicle M by the driver. For example, monitoring the front denotes a state in which the gaze of the driver is directed to the front.

The judgment processor 130 judges whether or not a vehicle is present on a road shoulder (which will be described below), and when it is judged that a vehicle is present on a road shoulder, the lane change controller 160 is caused to curb a lane change. Curbing denotes suspension of a lane change, a delay of a lane change, or the like. Details of this processing will be described below.

The speed controller 140 automatically controls the speed of the host vehicle M by automatically controlling the traveling driving force output device 200 and the brake device 210 without depending on an operation of the driver. The speed controller 140 executes so-called adaptive cruise control (ACC).

For example, when no different vehicle is present in front of the host vehicle M within a predetermined distance from the host vehicle M, the speed controller 140 automatically controls the traveling driving force output device 200 and the brake device 210 without depending on an operation of the driver such that the host vehicle M moves at a speed set by the driver or at a speed set in advance correspondingly to a legal speed limit or a road.

For example, when a different vehicle is present in front of the host vehicle M within a predetermined distance from the host vehicle M, the speed controller 140 automatically controls the traveling driving force output device 200 and the brake device 210 without depending on an operation of the driver such that the host vehicle M follows the different vehicle. Following denotes that the host vehicle M travels behind a different vehicle while maintaining a position at a predetermined distance from the different vehicle.

The lane maintaining controller 150 controls the steering device 220 such that the host vehicle M does not depart from the traveling lane. For example, the lane maintaining controller 150 controls the steering device 220 such that the host vehicle M travels at the center or in the vicinity of the center of the traveling lane recognized by the recognizer 110. Hereinafter, this control may be referred to as "lane maintaining control". The lane maintaining controller 150 executes the hands-on lane maintaining control and the hands-off lane maintaining control.

The hands-on lane maintaining control is control executed in a state in which the driver is gripping the steering wheel (a state in which the steering grip sensor 86 has detected the steering wheel being gripped). Conditions for allowing execution of the hands-on lane maintaining control are less strict than conditions for allowing execution of the hands-off lane maintaining control. For example, the hands-on lane maintaining control is executed under the condition that the speed of the host vehicle M is equal to or higher than a predetermined speed and the driver is monitoring the front.

The hands-off lane maintaining control is control executed in a state in which the driver is not gripping the steering wheel (a state in which the steering grip sensor 86 has not detected the steering wheel being gripped). For example, the hands-off lane maintaining control can be executed when the following conditions are satisfied. That is, the speed of the host vehicle M is equal to or higher than a predetermined speed, the host vehicle M is traveling on a predetermined road (for example, a road or the kind of a road set in advance such that the hands-off lane maintaining control can be executed), and the driver is monitoring the front. The hands-off lane maintaining control is executed when the driver is monitoring the front, and the hands-off lane maintaining control is not executed or is stopped when the driver is not monitoring the front.

The conditions for allowing execution of the hands-on lane maintaining control and the hands-off lane maintaining control described above are an example, other conditions (for example, the host vehicle M is following a preceding vehicle) may be included or some conditions may be omitted. The conditions for allowing execution of the hands-on lane maintaining control need only be less strict than the conditions for allowing execution of the hands-off lane maintaining (the conditions for allowing execution of the hands-off lane maintaining control need only be stricter than the conditions for allowing execution of the hands-on lane maintaining).

The lane change controller 160 causes the host vehicle M to automatically make a lane change. For example, the lane change controller 160 generates a target trajectory for a lane change and causes the host vehicle M to make a lane change such that the host vehicle M travels along the generated trajectory. A target trajectory is a trajectory in which the host vehicle M travels in the future. For example, a target trajectory may include a speed element. For example, a target trajectory is expressed as a sequence of points (trajectory points) which the host vehicle M should reach. A trajectory point is a point which the host vehicle M should reach every predetermined traveling distance (for example, approximately several [m]) that is a distance along the road. Separately, a target speed and a target acceleration are generated every predetermined sampling time (for example, on the order of approximately several tenths of [sec]) as a part of the target trajectory. A trajectory point may be a position which the host vehicle M should reach at a sampling time of every predetermined sampling time. In this case, information of the target speed and the target acceleration is expressed at intervals of the trajectory points.

The lane change controller 160 causes the host vehicle M to make a lane change (ALC; auto lane change) on the basis of a destination set by an occupant, a route generated by the planner 170, and a recommendation lane output by the MPU 60. For example, the lane change controller 160 performs a lane change when a lane change is necessary to be headed for a destination. For example, when the driver has set in advance to utilize auto lane change (when auto lane change is in use), this auto lane change is executed.

When a lane change is instructed by the driver, the lane change controller 160 may cause the host vehicle M to automatically make a lane change. Instruction of a lane change is an operation of a lever of the operation switch of the direction indicator. For example, if the driver operates the lever in a direction in which the driver desires to cause the host vehicle M to make a lane change, the host vehicle M makes a lane change in the direction corresponding to the operation. Instruction of a lane change may be an operation different from an operation of the lever of the operation switch of the direction indicator. For example, a lane change may be made when a predetermined operation button is pressed.

For example, when the following conditions are satisfied, the lane change controller 160 executes a lane change. Examples of the conditions include that no obstacle is present in a lane change destination lane, the host vehicle M does not interfere with surrounding different vehicles when making a lane change, the host vehicle M is not in a section where a lane change is prohibited (there is no road marking or sign prohibiting a lane change), a lane change destination lane has been recognized (it actually exists), a yaw rate detected by the vehicle sensor 40 is lower than a threshold, and the radius of curvature of the traveling road is equal to or larger than a predetermined value. The conditions for executing a lane change may include other conditions, and some conditions may be omitted.

For example, the lane change controller 160 may execute a lane change on condition that the driver is gripping the steering wheel (the steering grip sensor 86 has detected the steering wheel being gripped).

The planner 170 generates a plan for traveling of the host vehicle M on the basis of the route along which the host vehicle M is headed for the destination set by an occupant. Essentially, the planner 170 generates a route, a traveling lane, and a target trajectory in which the host vehicle M automatically (without depending on an operation of the driver) travels in the future such that the host vehicle M can travel in a recommendation lane determined by the recommendation lane determiner 61 and can also cope with the surrounding situation of the host vehicle M.

For example, the planner 170 causes the host vehicle M to travel in the target trajectory in association with the speed controller 140, the lane maintaining controller 150, and the lane change controller 160. This control may be referred to as "driving support control".

For example, in a state in which the driver of the host vehicle M is monitoring surrounding areas of the host vehicle M, the speed controller 140 controls the speed of the host vehicle M and the lane maintaining controller 150 or the lane change controller 160 controls steering such that the host vehicle M is caused to automatically travel in a first lane or the host vehicle M is caused to automatically make a lane change from the first lane to a second lane. The planner 170 generates an action plan for the host vehicle M as necessary such that the host vehicle M reaches a destination due to the driver controlling the speed, gripping the steering wheel, or operating the steering wheel. For example, the planner 170 generates a plan in which the host vehicle M is caused to travel by an operation of the driver in a first section and the host vehicle M is caused to travel by control of the driving support device 100 in a second section and causes the host vehicle M to travel in association with the driver, the judgment processor 130, the speed controller 140, the lane maintaining controller 150, and the lane change controller 160 in accordance with the plan.

The information provider 180 causes the HMI 30 to output the state of the host vehicle M or various information related to driving support in a form of audio or images. For example, the information provider 180 issues a notification for a lane change when the host vehicle M is scheduled to execute a lane change and before a lane change is started.

The traveling driving force output device 200 outputs a traveling driving force (torque) for causing the host vehicle M to travel to driving wheels. For example, the traveling driving force output device 200 includes a combination of an internal-combustion engine, an electric motor, a transmission, and the like, and an ECU controlling these. The ECU controls the foregoing constituents in accordance with information input from the speed controller 140 or information input from the driving operation piece 80.

For example, the brake device 210 includes a brake caliper, a cylinder transmitting a hydraulic pressure to the brake caliper, an electric motor generating a hydraulic pressure in the cylinder, and a brake ECU. The brake ECU controls the electric motor in accordance with information input from the speed controller 140 or information input from the driving operation piece 80 such that a brake torque corresponding to a braking operation is output to each of the wheels.

For example, the steering device 220 includes a steering ECU and an electric motor. For example, the electric motor causes a force to act on a rack-and-pinion mechanism to change the direction of steered wheels. The steering ECU drives the electric motor to change the direction of the steered wheels in accordance with information input from the lane maintaining controller 150 or the lane change controller 160 or information input from the driving operation piece 80.

[Processing Related to Lane Change (1)]

When the host vehicle M is scheduled (planned) to make a lane change from the first lane to the second lane, the driving support device 100 executes a lane change when no vehicle is present on a target road shoulder in a direction of the lane change and adjacent to the second lane and curbs a lane change when a vehicle is present on the target road shoulder. When a vehicle is at a stop on a target road shoulder, the driving support device 100 does not cause the host vehicle M to execute a lane change. For example, the direction of a lane change denotes a road shoulder in a region from the host vehicle M to several tens of meters in front of the host vehicle M or a road shoulder in a region from a location at a first predetermined distance in front of the host vehicle M to a location at a second distance (a distance longer than the first distance) in front of the host vehicle M.

For example, a target road shoulder in a direction of the lane change and adjacent to the second lane denotes a region on a road shoulder corresponding to a section from a position where the host vehicle M starts a lane change (for example, a position at a timing when a lateral movement starts, a position at a timing when an occupant is notified of a lane change, or a position at a timing when the direction indicator is turned on) to a position where a lane change or a lateral movement ends. For example, ending denotes an arbitrary timing such as a time when the host vehicle M is positioned at the center of a lane change destination lane, a time when it has traveled a predetermined distance from the center, or a time when it has approached the center. For example, ending may denote a time when control can be performed by the hands-off lane maintaining control (timing of control switching) when a hands-on lane change has been executed.

The judgment processor 130 of the driving support device 100 delays a lane change when a road shoulder region is set and a different vehicle is present in the set road shoulder region (target road shoulder). For example, the driving support device 100 curbs a lane change to the second lane based on a first plan when a different vehicle is present in the road shoulder region. For example, the first plan denotes a plan for a lane change and a behavior of the host vehicle M in the future based on a trajectory during a period from when the host vehicle M starts a lane change until it ends.

A target road shoulder is a road shoulder in a target section adjacent to the second lane. A target section is a section in a proceeding direction of the host vehicle M where the host vehicle M is positioned for a time period from a first time at which a lane change is in progress to a second time at which the lane change ends when it is assumed that the host vehicle M has executed a lane change on the basis of the first plan.

Figure 2:
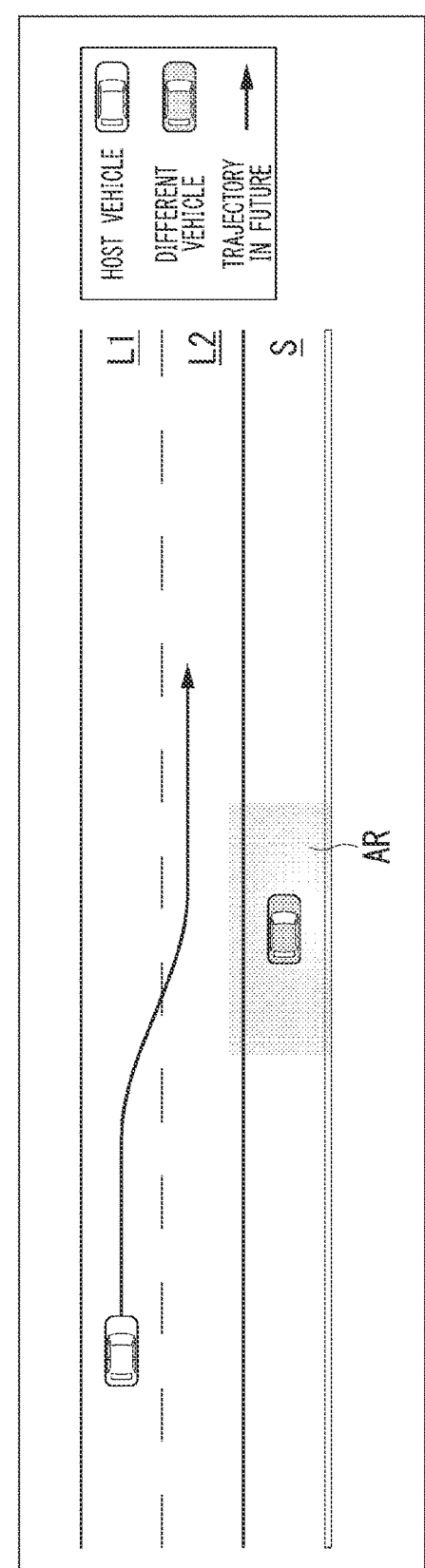
FIG. 2 is a view showing an example of a scene in which a vehicle M does not make a lane change.

FIG. 2 is a view showing an example of a scene in which the host vehicle M does not make a lane change. The host vehicle M is traveling in a lane L1. The host vehicle M is scheduled to be headed for a destination by making a lane change from the lane L1 (first lane) to a lane L2 (second lane). For example, the driving support device 100 generates a trajectory (future trajectory) when making a lane change in order to make a lane change at a timing planned in advance. The driving support device 100 sets a road shoulder region AR on a road shoulder S on the basis of the future trajectory and does not execute a lane change when a different vehicle is present in the road shoulder region AR.

The presence of a different vehicle in the road shoulder region AR may be the presence of a part of a different vehicle in the road shoulder region AR or may be the presence of the entirety of a different vehicle in the road shoulder region AR. For example, in a width direction of the road shoulder region AR, a part of a different vehicle may be present in the road shoulder region AR, or the entirety of a different vehicle may be present in the road shoulder region AR. The same applies to a length direction of the road shoulder region AR.

[Processing of Setting Road Shoulder Region (1)]

Figure 3:
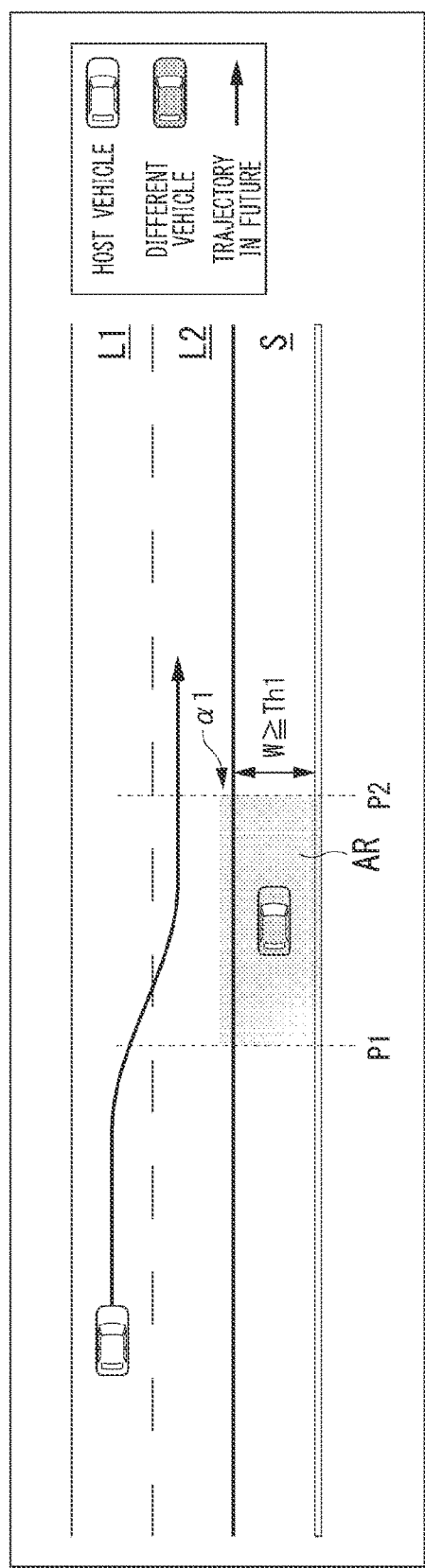
FIG. 3 is an explanatory view (1) of a road shoulder region.

FIG. 3 is an explanatory view (1) of a road shoulder region. When a width W of the road shoulder is equal to or larger than a threshold Th1, the judgment processor 130 sets the road shoulder region AR in a manner of including the road shoulder and a region having a width extended from the road shoulder at a predetermined distance α1 (for example, 0.5 m) to the lane L2 side. The judgment processor 130 sets a section from a first point P1 to a second point P2 in a future trajectory (a section in the length direction related to the proceeding direction of the host vehicle M) to the length of the road shoulder region AR.

For example, the first point P1 is a position at a time when it is estimated that the host vehicle M will have come into contact with a road division line of the lane L2 on the lane L1 side during a lane change (the first time or a seventh time), and the second point P2 is, for example, a position at a time when it is estimated that the host vehicle M will have completed (or ended) a lane change (the second time or an eighth time). Completion of a lane change denotes that the host vehicle M (a reference position of the host vehicle M) has reached the center or a location in the vicinity of the center of the lane L2, that the host vehicle M has reached the center or a location in the vicinity of the center of the lane L2 and control has started such that the host vehicle M travels at the center of the lane L2, that control of a lane change has switched to other control, or the like. The section from the first point to the second point is an example of a target section. A target section may be arbitrarily set.

[Processing of Setting Road Shoulder Region (2)]

For example, the first point P1 and the second point P2 need only be positions corresponding to timings based on the behavior of the host vehicle M related to a lane change. For example, the first point P1 may be an arbitrary position such as a position of the host vehicle M at a time when the driving support device 100 notifies an occupant of a lane change to be made or a position of the host vehicle M at a time when the direction indicator is turned on. The second point P2 may be a position at a timing when the host vehicle M has reached the lane L2, a position at a timing when the vehicle body of the host vehicle M has entered the lane L2 by a predetermined degree or more (a predetermined proportion or more), a position at a timing when the host vehicle M has traveled a predetermined distance after it has entered the lane L2, or the like.

Figure 4:
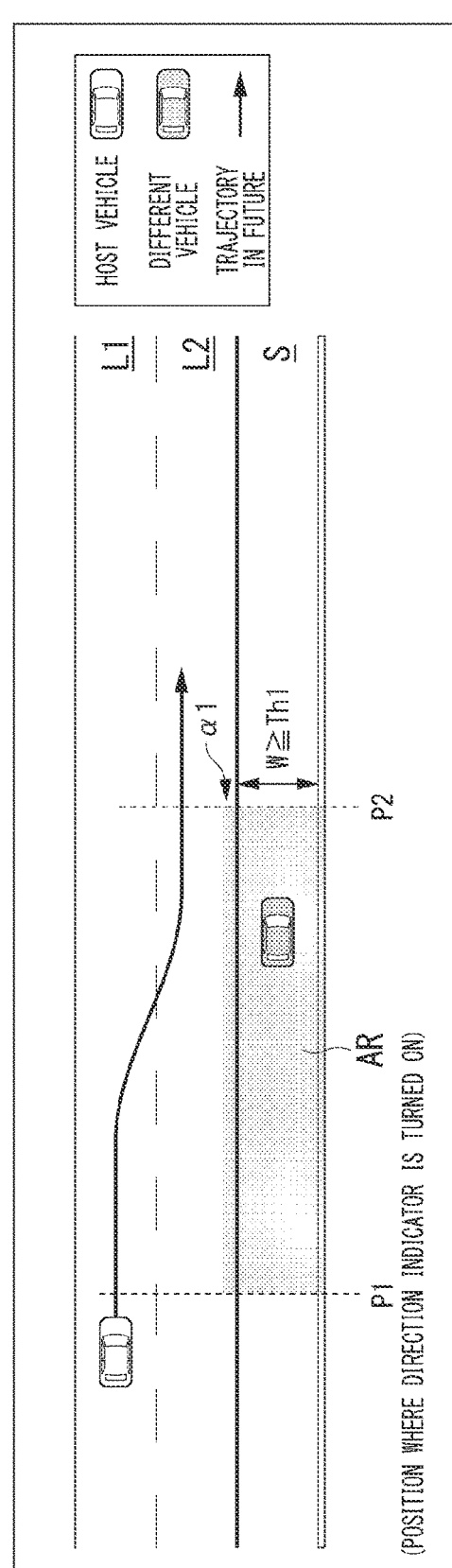

FIG. 4 is a view showing an example when the first point is a location for a timing for the direction indicator to be turned on. The driving support device 100 executes a lane change after causing the direction indicator to display a lane change to be made to the lane L2. The driving support device 100 curbs a lane change when the host vehicle M is present in the road shoulder region AR adjacent to the lane L2 (target section). The target section is a section in the proceeding direction of the host vehicle M from a position of the host vehicle M at a fifth time at which the driving support device 100 is scheduled to cause the direction indicator to display a lane change to be made to the lane L2 (first point P1) to a position of the host vehicle M at a sixth time at which the lane change is scheduled to be completed (second point P2).

As described above, the driving support device 100 sets a road shoulder region on the basis of a position at a timing when the direction indicator is turned on, thereby being able to reduce uneasiness that the host vehicle M is headed for a different vehicle in the road shoulder region.

Although illustration is omitted, as described above, the first point P1 may be a position at a timing when the HMI 30 notifies an occupant of the host vehicle M of a lane change to be made. The driving support device 100 executes a lane change after notifying an occupant of the host vehicle M of a lane change to be made via the HMI 30. The driving support device 100 curbs a lane change when a different vehicle is present in the road shoulder region AR adjacent to the lane L2 (target section). The target section is a section in the proceeding direction of the host vehicle M from a position of the host vehicle M at a third time at which the driving support device 100 is scheduled to issue a notification (first point) to a position of the host vehicle M at a fourth time at which the lane change is scheduled to be completed.

As described above, the driving support device 100 sets a road shoulder region on the basis of a position at a timing when a notification for a lane change is issued, thereby being able to reduce uneasiness that the host vehicle M is headed for a different vehicle in the road shoulder region.

The foregoing examples have described that the reference point in a particular region AR is identified on the basis of the turning-on timing of the direction indicator, the notification timing of a lane change, or the like. However, the reference point may be fixed, and a region for performing processing of recognizing a vehicle present on a road shoulder may be set on the basis of the turning-on timing of the direction indicator, the notification timing of a lane change, or the like. For example, the driving support device 100 may judge whether or not a different vehicle is present in a region from a position of the host vehicle M at the turning-on timing of the direction indicator or the starting timing of a notification to the second point, and when a different vehicle is present in this region, it may be judged whether or not the different vehicle is positioned in the road shoulder region AR. Accordingly, the driving support device 100 can more accurately recognize a different vehicle positioned in the road shoulder region AR.

[Processing of Setting Road Shoulder Region (3)]

Figure 5:
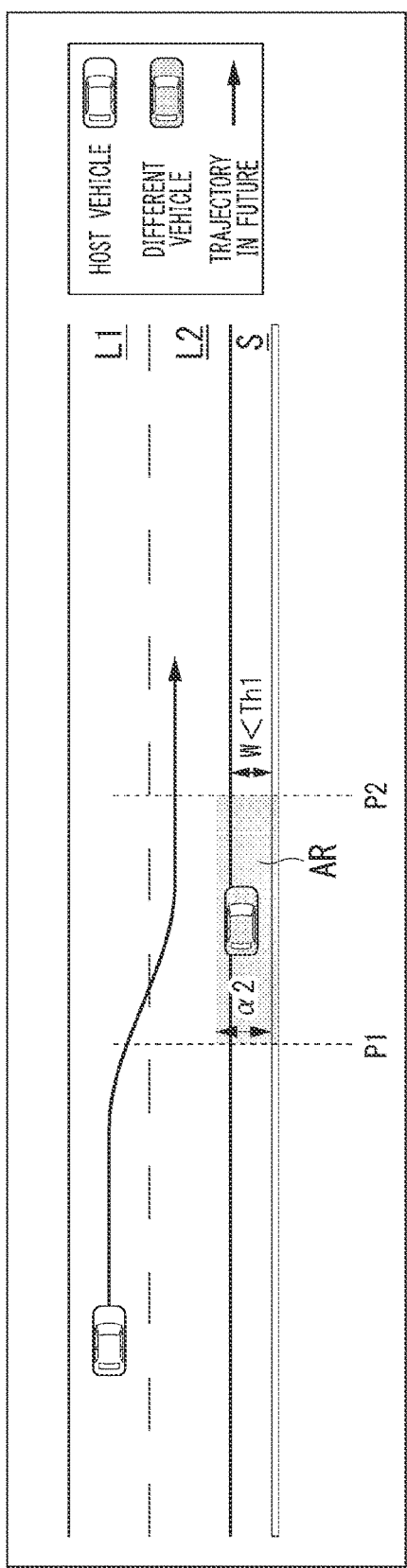
FIG. 5 is an explanatory view (2) of the road shoulder region.
Figure 5:
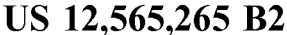

FIG. 5 is an explanatory view (2) of the road shoulder region. When the width W of the road shoulder is smaller than the threshold Th1, the judgment processor 130 sets the road shoulder region AR in a manner of including a region having a width extended from an end part of the road shoulder at a predetermined distance α2 (for example, 2.5 m) to the lane L2 side. A technique of setting the length of the road shoulder region AR is similar to that described in FIG. 3.

As described above, the driving support device 100 can set the road shoulder region AR to an appropriate region on the basis of a lane change plan of the host vehicle M and the width of the road shoulder.

[Lane Change when Different Vehicle is Present in Road Shoulder Region (1)]

When a different vehicle is present in the road shoulder region AR, the driving support device 100 does not execute a lane change set as described above. For example, the driving support device 100 delays a lane change. For example, the driving support device 100 executes a lane change after passing a different vehicle in the road shoulder region AR. For example, the driving support device 100 turns on the direction indicator and executes a lane change after passing a different vehicle in the road shoulder region AR.

Figure 6:
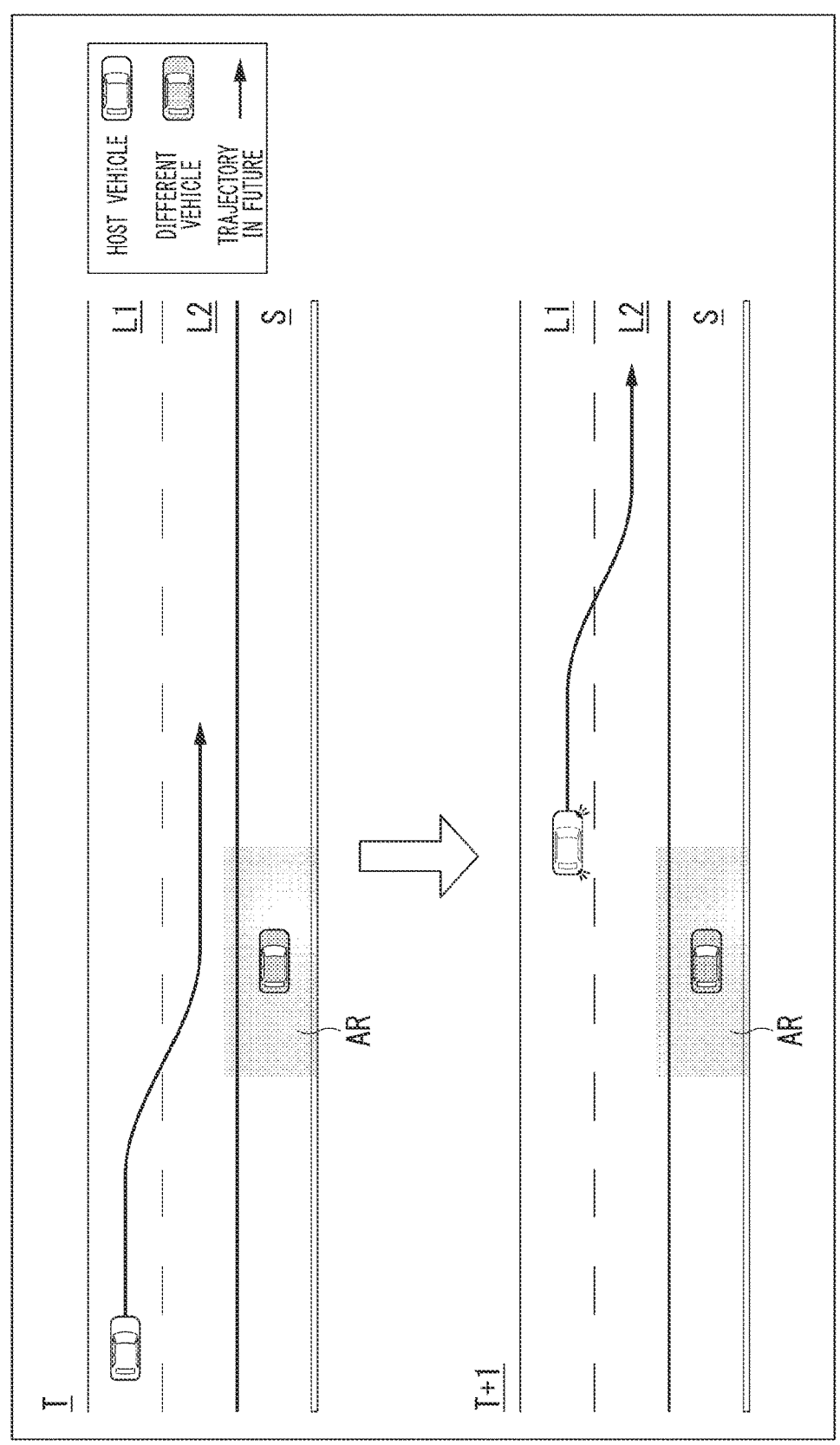
FIG. 6 is a view (1) showing an example of a scene in which the host vehicle M delays a lane change.

FIG. 6 is a view (1) showing an example of a scene in which the host vehicle M delays a lane change. As shown in the diagram, if the host vehicle M executes a lane change in a future trajectory at a time T, when a different vehicle is present in the road shoulder region AR, the host vehicle M cancels the lane change in the future trajectory at the time T and newly generates a future trajectory. An example of a new future trajectory is that at a time T+1. As shown in the diagram at the time T+1, the host vehicle M generates a future trajectory for executing a lane change after passing a different vehicle and executes a lane change on the basis of the generated trajectory. The future trajectory at the time T+1 in FIG. 6 is a trajectory in which the host vehicle M turns on the direction indicator and executes a lane change after passing a different vehicle.

In this case, the driving support device 100 may notify an occupant of a lane change to be executed via the HMI 30 before turning on the direction indicator and before passing a different vehicle or may turn on the direction indicator after notifying an occupant of a lane change to be executed via the HMI 30 after passing a different vehicle.

As described above, since the driving support device 100 issues a notification, turns on the direction indicator, executes a lane change, or the like at a timing within which an occupant does not feel uneasy, it is possible to realize vehicle control taking an occupant into account.

[Lane Change when Different Vehicle is Present in Road Shoulder Region (2)]

For example, the driving support device 100 notifies an occupant of the host vehicle M of a lane change to be made via the HMI 30 before passing a different vehicle in the road shoulder region AR. The driving support device 100 causes the direction indicator to display a lane change to the lane L2 before passing a different vehicle in the road shoulder region AR.

Figure 7:
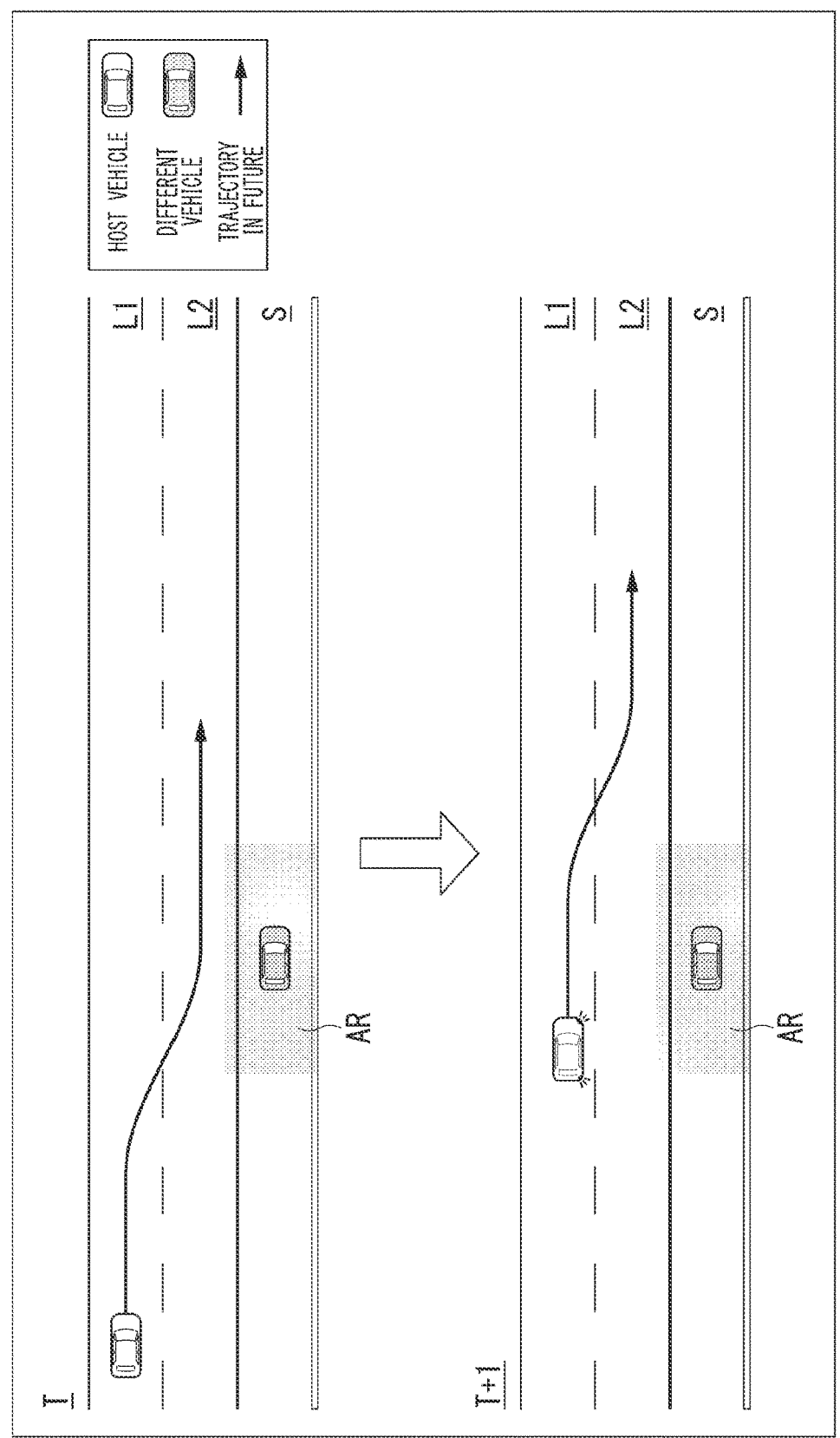
FIG. 7 is a view (2) showing an example of a scene in which the host vehicle M delays a lane change.

FIG. 7 is a view (2) showing an example of a scene in which the host vehicle M delays a lane change. Description will focus on points different from FIG. 6. Another example of a new future trajectory when a lane change is delayed is that at the time T+1. As shown in the diagram at the time T+1, the host vehicle M issues a notification for executing a lane change to an occupant and turns on the direction indicator before passing a different vehicle. The host vehicle M starts a lateral movement toward the lane L2 and executes a lane change after passing a different vehicle. For example, the driving support device 100 turns on the direction indicator at a timing predetermined several seconds before a timing when passing a different vehicle. Accordingly, the host vehicle M turns on the direction indicator for predetermined seconds and can thereby start a lane change (for example, a movement in the lateral direction) at a timing immediately after passing a different vehicle or after a predetermined time after passing a different vehicle.

As described above, since the driving support device 100 issues a notification, turns on the direction indicator, executes a lane change, or the like at a timing within which an occupant does not feel uneasy, it is possible to realize vehicle control taking an occupant into account.

[Flowchart (Part 1)]

Figure 8:
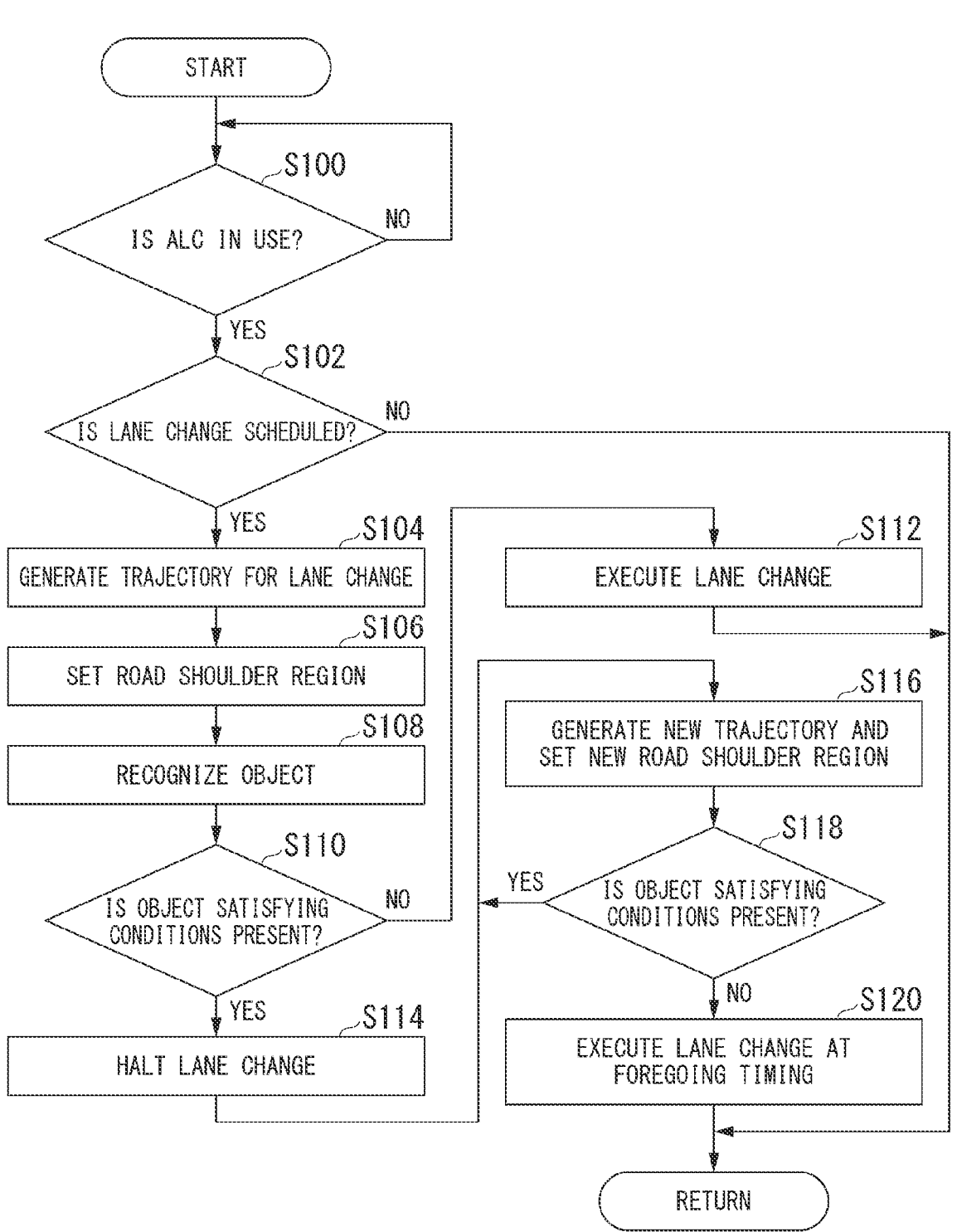
FIG. 8 is a flowchart showing an example of a flow of processing executed by a driving support device.

FIG. 8 is a flowchart showing an example of a flow of processing executed by the driving support device 100. First, the driving support device 100 judges whether or not a driver is using the ALC (Step S100). When a driver is using the ALC (when a lane change to be executed toward a destination is set utilizing the ALC), the driving support device 100 judges whether or not a lane change is scheduled within a predetermined time (Step S102). When a lane change is not scheduled within the predetermined time, processing of one routine in this flowchart ends.

When a lane change is scheduled within the predetermined time, the driving support device 100 generates a trajectory for a lane change (Step S104). Next, the driving support device 100 sets the road shoulder region AR (Step S106) and recognizes an object in the road shoulder region AR (Step S108).

Next, the driving support device 100 judges whether or not an object satisfying the conditions is present (Step S110). For example, an object satisfying the conditions denotes that an object is present within the road shoulder region AR, the attribute of an object is vehicle, and the degree of reliability in recognition of an object is equal to or higher than a threshold.

When an object satisfying the conditions is not present, the driving support device 100 executes a lane change on the basis of the trajectory generated in Step S104 (Step S112). When an object satisfying the conditions is present, the driving support device 100 halts a lane change (Step S114). Next, the driving support device 100 generates a new trajectory for executing a lane change after passing a different vehicle in the road shoulder region AR and sets a new road shoulder region AR on the basis of the generated new trajectory (Step S116).

Next, the driving support device 100 judges whether or not an object satisfying the conditions is present in the new road shoulder region AR (Step S118). When an object satisfying the conditions is present in the new road shoulder region AR, the processing returns to Step S116, and the driving support device 100 generates a trajectory and sets the road shoulder region AR again (Step S116). When an object satisfying the conditions is not present in the new road shoulder region AR, the driving support device 100 executes a lane change on the basis of the new trajectory (Step S120). Accordingly, processing of one routine in this flowchart ends.

As described above, the driving support device 100 can realize control of the host vehicle M taking an occupant into account by delaying a lane change when a different vehicle is present in the road shoulder region.

In this processing, description has been given regarding processing related to a road shoulder region. However, in parallel with this processing, the driving support device 100 executes processing of judging whether or not conditions for executing a lane change are satisfied on the basis of the situation or the like of the lane change destination lane. The driving support device 100 executes a lane change when a different vehicle is not present in the road shoulder region and the conditions for a lane change are satisfied.

[Processing of Suspending or Continuing Lane Change after Movement for Lane Change has Started]

The driving support device 100 determines whether to continue or halt a lane change on the basis of the state of the host vehicle M when a different vehicle present in the road shoulder region AR cannot be recognized before starting the lane change but a different vehicle present in the road shoulder region AR is recognized after the lane change has started (for example, after a lateral movement has started, after a notification for making a lane change has been issued, or after the direction indicator has been turned on).

Figure 9:
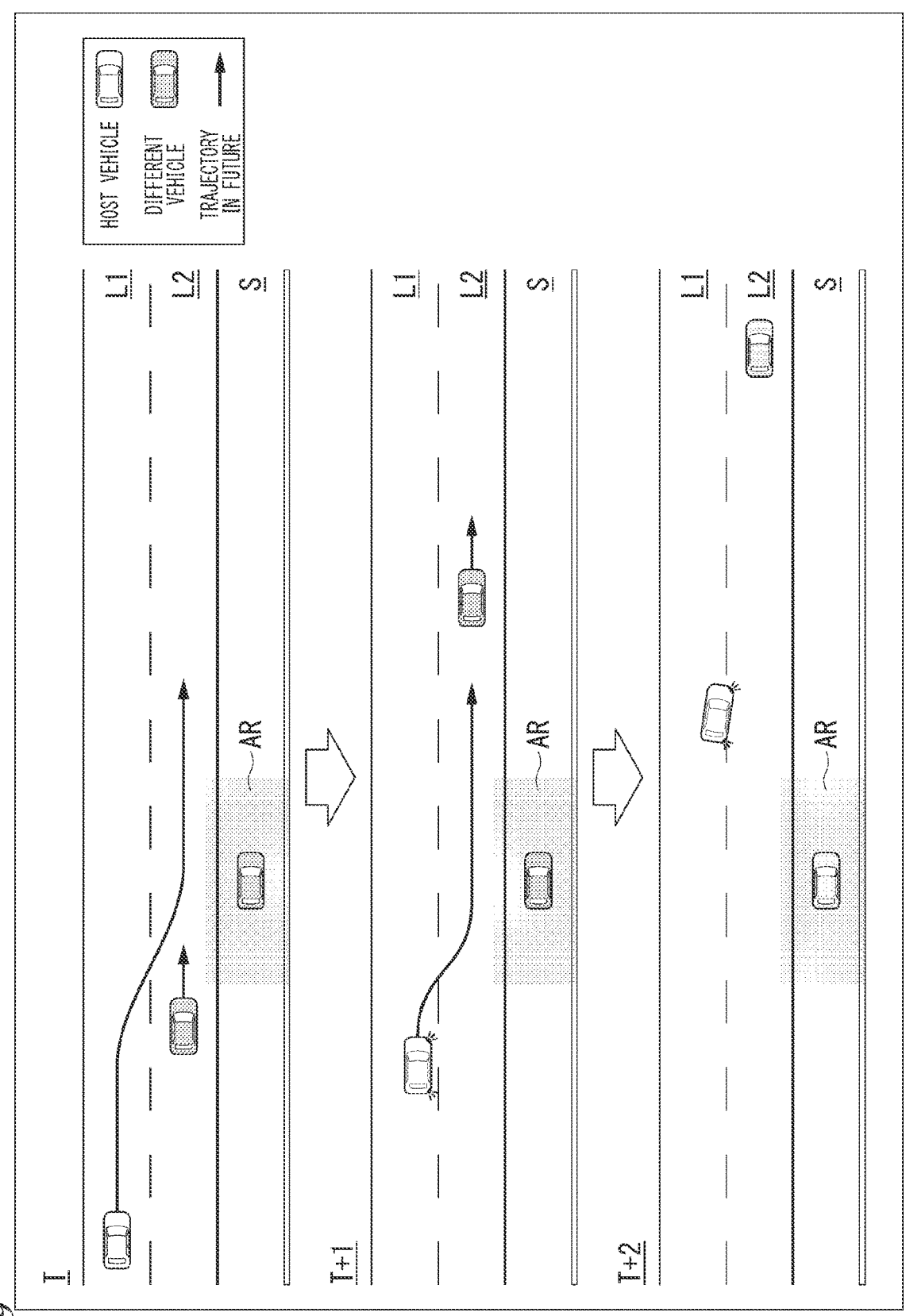
FIG. 9 is a view showing an example when a lane change is suspended after movement has started.

FIG. 9 is a view showing an example when a lane change is suspended after movement has started. At the time T, it is assumed that the driving support device 100 could not recognize a different vehicle in the road shoulder region AR due to another different vehicle in the lane L2. At the time T+1, when the driving support device 100 recognizes the different vehicle in the road shoulder region AR after the different vehicle in the lane L2 has proceeded, when the host vehicle M does not satisfy the conditions, a lane change is halted.

For example, the conditions denote that the host vehicle M comes into contact with a division line dividing the lane L1 and the lane L2. For example, halting denotes that the host vehicle M acts such that the host vehicle M does not enter the lane L2. When it is halted, for example, the host vehicle M travels the lane L1 for a predetermined time.

The foregoing conditions may be that the direction indicator is turned on, an occupant is notified of a lane change, or the host vehicle M starts a lateral movement. The foregoing conditions may be that a lateral movement of the host vehicle M in a direction toward the lane L2 is equal to or higher than a threshold, the speed of a lateral movement of the host vehicle M in the direction toward the lane L2 is equal to or higher than a threshold, an index related to the yaw rate of the host vehicle M in the direction toward the lane L2 is equal to or higher than a threshold, or the like, or it may be that a combination of these satisfies a standard. Moreover, the foregoing conditions may be that the vehicle body of the host vehicle M has entered the lane L2 by a predetermined proportion or more.

At a time T+2, the driving support device 100 causes the host vehicle M to make a lane change from the lane L1 to the lane L2 on the basis of the new future trajectory generated after the time T+1. The new future trajectory is a trajectory in which the host vehicle M starts to move to the lane L2 after passing a different vehicle as described with FIG. 6 or 7.

[Processing of Continuing Lane Change after Movement for Lane Change has Started]

Figure 10:
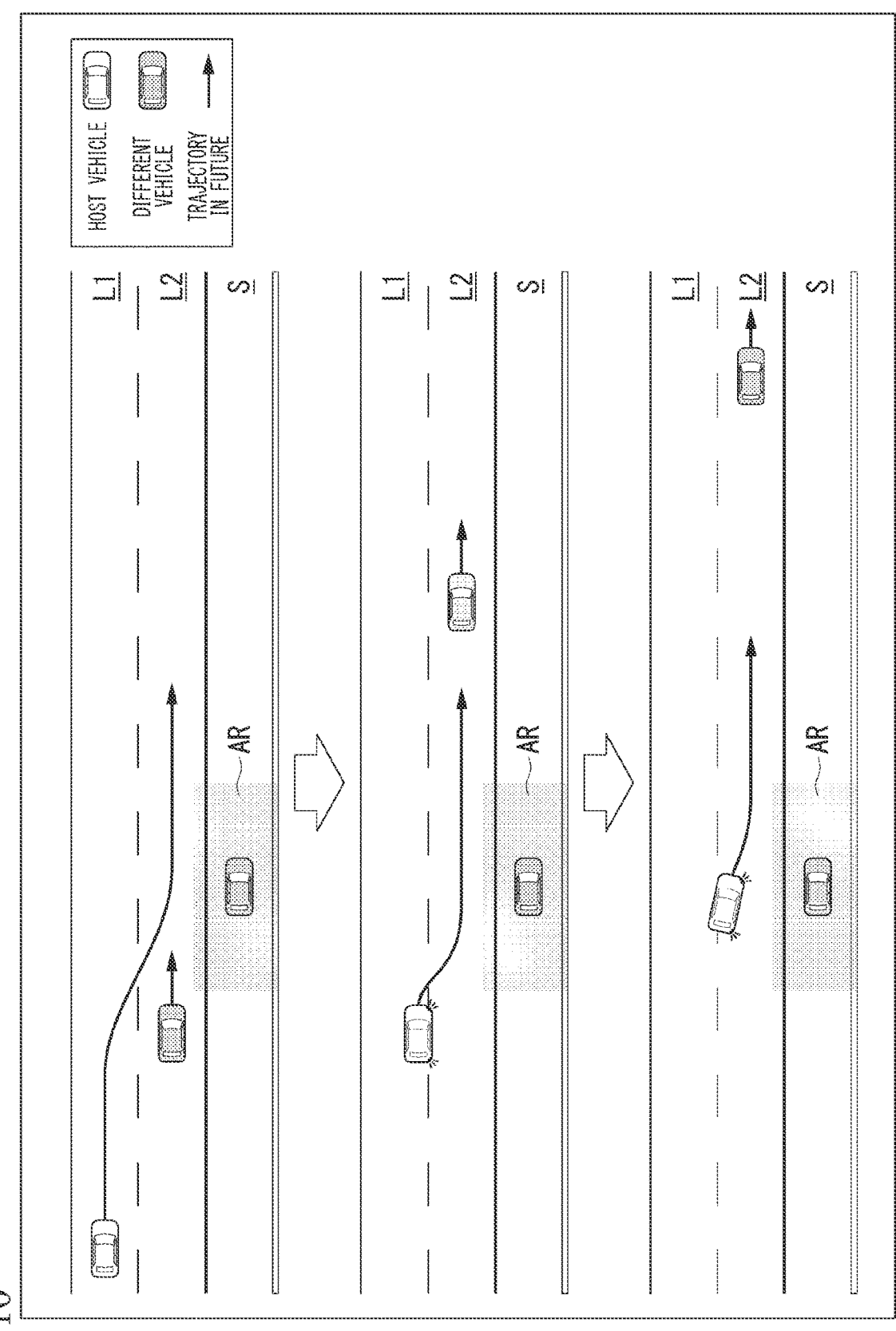
FIG. 10 is a view showing an example when a lane change is continued after movement has started.

FIG. 10 is a view showing an example when a lane change is continued after movement has started. Description similar to that of FIG. 9 will be omitted. At the time T+1, when the driving support device 100 recognizes a different vehicle in the road shoulder region AR after a different vehicle in the lane L2 has proceeded, a lane change is continued when the host vehicle M does not satisfy the conditions (when the host vehicle M comes into contact with the division line dividing the lane L1 and the lane L2). At the time T+2, the driving support device 100 causes the host vehicle M to continue a lane change and completes the lane change after the host vehicle M has moved to the lane L2.

[Flowchart (Part 2)]

Figure 11:
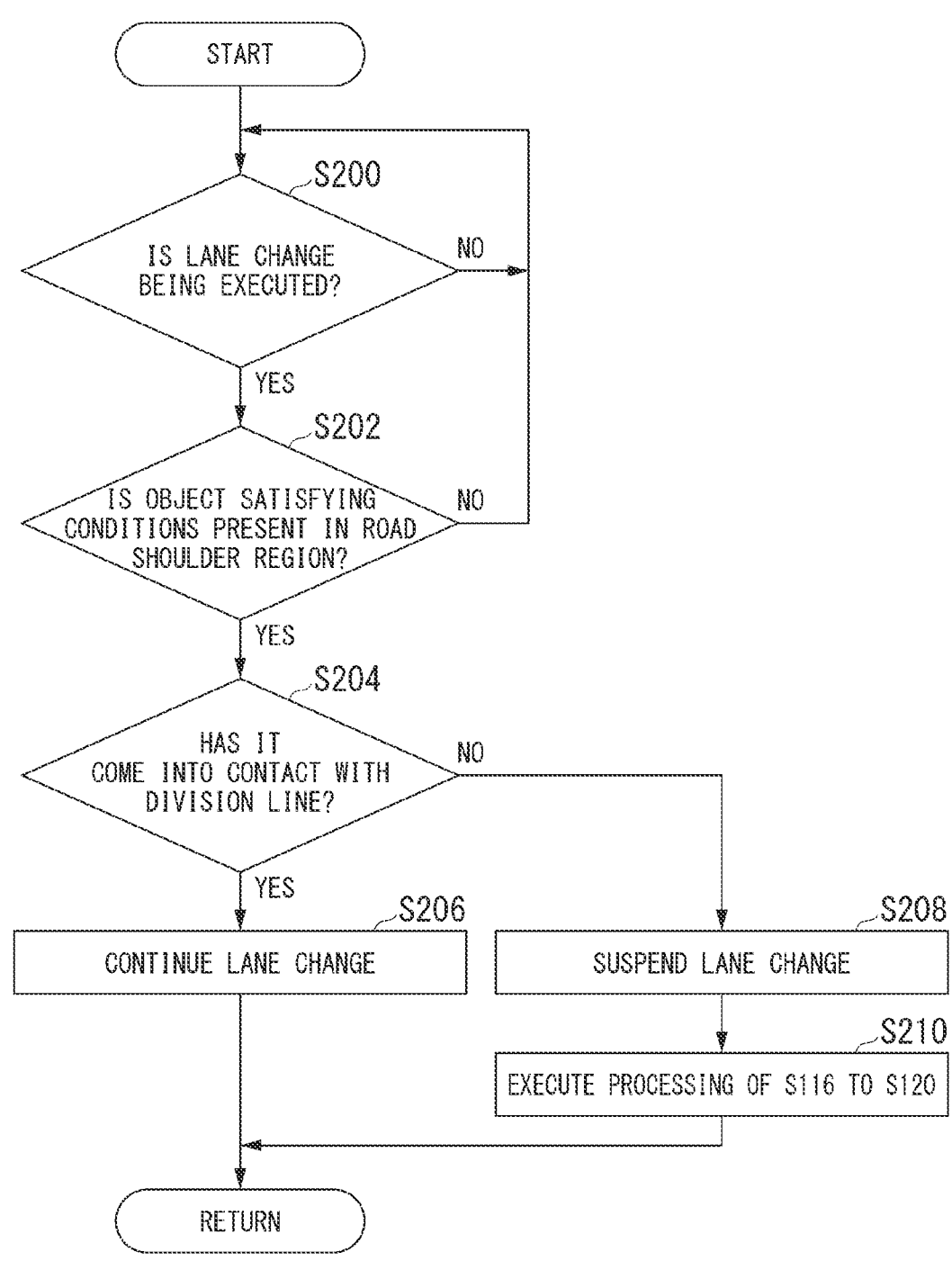
FIG. 11 is a flowchart showing another example of a flow of processing executed by the driving support device.

FIG. 11 is a flowchart showing another example of a flow of processing executed by the driving support device 100. First, the driving support device 100 judges whether or not the host vehicle M is executing a lane change (Step S200). When a lane change is being executed, the driving support device 100 judges whether or not an object satisfying the conditions is present in the road shoulder region AR (Step S202). When an object satisfying the conditions is not present in the road shoulder region AR, the processing returns to Step S200.

When an object satisfying the conditions is present in the road shoulder region AR, the driving support device 100 judges whether or not the host vehicle M has come into contact with the division line dividing the lane L1 and the lane L2 (Step S204). When the vehicle M has come into contact with the division line dividing the lane L1 and the lane L2, the driving support device 100 continues a lane change (Step S206). When the vehicle M has not come into contact with the division line dividing the lane L1 and the lane L2, the driving support device 100 suspends a lane change (Step S208) and executes the processing of Steps S116 to S120 in FIG. 8 described above (Step S210). In this processing, the driving support device 100 executes a lane change when a different vehicle satisfying the conditions is not present in the road shoulder region AR in the generated trajectory for executing a lane change. Accordingly, processing of one routine in this flowchart ends.

As described above, even when visibility in the road shoulder region is poor, the driving support device 100 can realize control of the host vehicle M taking an occupant into account by the foregoing processing.

According to the first embodiment described above, the driving support device 100 can realize control of the host vehicle M taking an occupant into account by controlling a lane change of the host vehicle M on the basis of the presence or absence of a vehicle in a road shoulder region.

Second Embodiment

Hereinafter, a second embodiment will be described. In the first embodiment, a different vehicle being at a stop is taken as a target. However, in the second embodiment, a moving different vehicle is taken as a target. Description will focus on points different from the first embodiment.

The driving support device 100 may delay the lane change without executing it when a different vehicle traveling on a road shoulder is present or when a different vehicle is present on a road shoulder around the host vehicle M (a road shoulder within several tens of meters) or a road shoulder in a direction in which the host vehicle M makes a lane change, or may delay the lane change without executing it when a different vehicle is present in the road shoulder region AR at a target time period as will be described below.

When it can be assumed that a different vehicle moving in the road shoulder region AR at any time from the first time to the second time is present, the driving support device 100 delays a lane change. When it is assumed that a different vehicle traveling on a road shoulder is present and another different vehicle traveling at the target time period and in the target road shoulder region AR is present, the driving support device 100 curbs a lane change to the lane L2 based on the first plan. The target road shoulder region AR is a region on the road shoulder adjacent to the lane L2 (target section). The target section is a section in the proceeding direction of the host vehicle M where the host vehicle M is positioned during the target time period from the first time at which a lane change is in progress to the second time at which the lane change ends when it is assumed that the host vehicle M has executed a lane change on the basis of the first plan.

Figure 12:
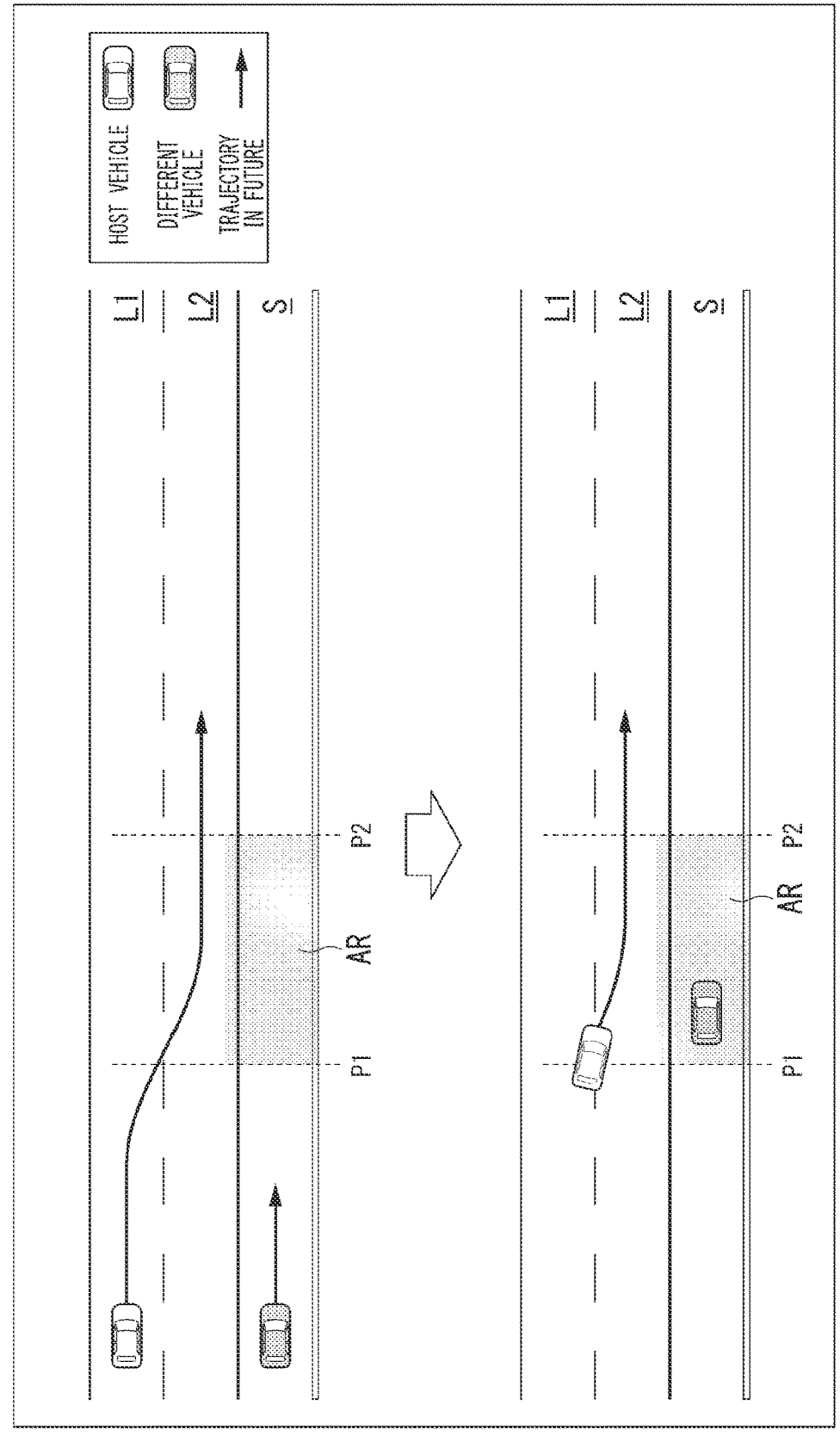
FIG. 12 is a view showing an example of a scene in which a lane change is delayed.

FIG. 12 is a view showing an example of a scene in which a lane change is delayed. When the host vehicle M is attempting a lane change from the lane L1 to the lane L2, a different vehicle is traveling on a road shoulder in the same direction as the host vehicle M. The driving support device 100 estimates the future position of the different vehicle. For example, the driving support device 100 estimates the time when the different vehicle reaches the first point P1, passes the second point P2, and then exits the road shoulder region in the future. The driving support device 100 estimates a starting time and an ending time during which a different vehicle is present in the road shoulder region as described above.

When the ending time, the ending time, or the time from the starting time to the ending time described above match or are included in the time from the first time to the second time, the driving support device 100 estimates that a different vehicle traveling on the road shoulder is a different vehicle which interferes with a lane change. The first time is a time at which the host vehicle M reaches the first point P1 when it has moved on the basis of the trajectory for a lane change. The second time is a time at which the host vehicle M reaches the second point P2 when it has moved on the basis of the trajectory for a lane change.

As shown in the upper diagram of FIG. 12, the driving support device 100 estimates the position of a different vehicle in the future when the host vehicle M makes a lane change. As shown in the lower diagram of FIG. 12, when the host vehicle M is positioned in the section from the first point P1 to the second point P2 or a location around it in the future, the driving support device 100 delays a lane change when a different vehicle is predicted to be positioned in the section from the first point P1 to the second point or a location around it in the future.

Figure 13:
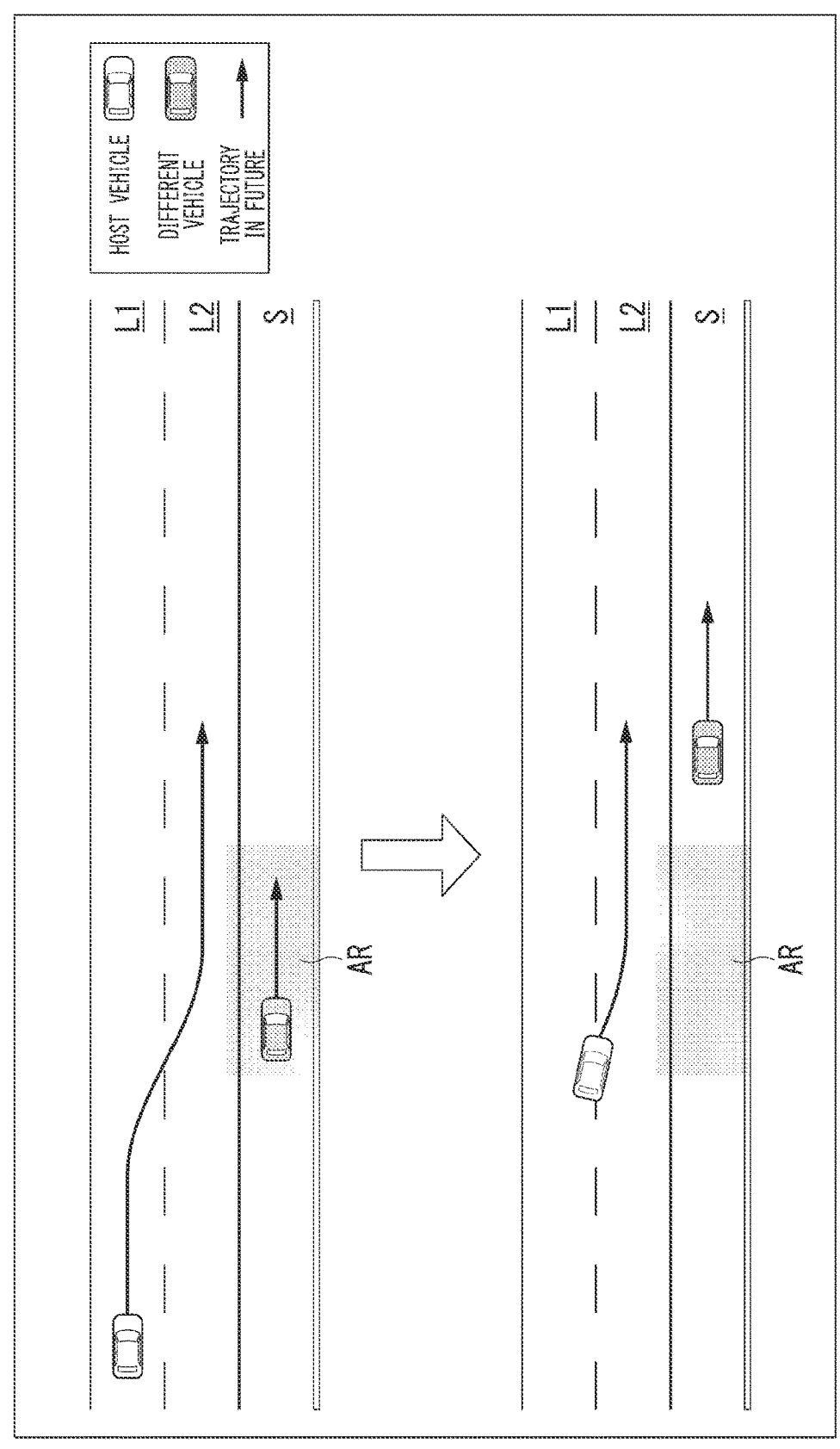
FIG. 13 is a view showing an example of a scene in which a lane change is not delayed.

FIG. 13 is a view showing an example of a scene in which a lane change is not delayed. As shown in the upper diagram of FIG. 13, the driving support device 100 estimates the position of a different vehicle in the future when the host vehicle M makes a lane change. As shown in the lower diagram of FIG. 13, when the host vehicle M is positioned in the section from the first point P1 to the second point P2 or a location around it in the future, the driving support device 100 executes a lane change without delaying the lane change on the basis of the generated trajectory when it is predicted that a different vehicle has passed the section from the first point P1 to the second point or a location around it in the future.

According to the second embodiment described above, the driving support device 100 can realize control of the host vehicle M further taking an occupant into account by controlling a lane change of the host vehicle M on the basis of the future position of a different vehicle moving on a road shoulder.

The embodiments described above can be expressed as follows.

A control device configured to include a storage device storing a program, and a hardware processor. The hardware processor executes the program stored in the storage device to execute processing of recognizing a surrounding situation of a host vehicle, processing of causing the host vehicle to make a lane change from a first lane in which the host vehicle is traveling to a second lane adjacent to the first lane by controlling steering of the host vehicle on the basis of the surrounding situation, processing of executing the lane change when no vehicle is present on a target road shoulder in a direction of the lane change and adjacent to the second lane when the lane change is scheduled, and processing of curbing the lane change when a vehicle is present on the road shoulder.

Hereinafter, forms for performing the present invention have been described using embodiments, but the present invention is not limited to such embodiments in any way, and various kinds of deformation and replacement can be added thereto within a range not departing from the gist of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:
   a non-transitory storage medium storing computer-readable instructions; and
   at least one processor connected to the storage medium, wherein the processor executes the computer-readable instructions to:
   recognize a surrounding situation of a host vehicle;
   cause the host vehicle to make a lane change from a first lane in which the host vehicle is traveling to a second lane adjacent to the first lane by controlling steering of the host vehicle based on the surrounding situation, wherein, to cause the host vehicle to make the lane change, the processor executes the computer-readable instructions to:
   initiate, at a first time, execution of the lane change to a target section in the second lane in response to determining that no vehicle is present on the target section and that no vehicle is present on a target road shoulder adjacent to the target section in a direction of the lane change, and
   delay initiation of the execution of the lane change in response to determining that a vehicle is present on the target road shoulder and that no vehicle is present on the target section when the lane change is scheduled, and initiate, at a time later than the first time, the execution of the lane change to a section of the second lane that is in front of the target section after the host vehicle has passed the vehicle on the target road shoulder; and
   notify an occupant of the host vehicle of the lane change to be made via a notification device before the host vehicle has passed the vehicle on the road shoulder.

2. The vehicle control device according to claim 1, wherein the processor executes the computer-readable instructions to:
   suspend the lane change in response to determining that the vehicle is at a stop on the target road shoulder.

3. The vehicle control device according to claim 1, wherein the processor executes the computer-readable instructions to:
   suspend the lane change in response to determining that a vehicle traveling on the target road shoulder is present.

4. The vehicle control device according to claim 1, wherein
   the target section is a section in a proceeding direction of the host vehicle where the host vehicle is positioned for a time period from the first time at which the lane change is initiated to a second time at which the lane change ends based on a determination that the host vehicle has executed the lane change.

5. The vehicle control device according to claim 1, wherein the target road shoulder is a region on a road shoulder adjacent to the second lane, and the processor executes the computer-readable instructions to:

suspend the lane change to the second lane in response to a determination that a vehicle traveling on the road shoulder is present and another vehicle traveling on the target road shoulder during a target time period is present, wherein the target section is a section in a proceeding direction of the vehicle where the host vehicle is positioned during a target time period from a time at which a lane change is in progress to a time at which the lane change ends based on a determination that the host vehicle has executed the lane change.

6. A vehicle control device comprising:

a non-transitory storage medium storing computer-readable instructions; and at least one processor connected to the storage medium, wherein the processor executes the computer-readable instructions to:

recognize a surrounding situation of a host vehicle;

cause the host vehicle to make a lane change from a first lane in which the host vehicle is traveling to a second lane adjacent to the first lane by controlling steering of the host vehicle based on the surrounding situation, wherein, to cause the host vehicle to make the lane change, the processor executes the computer-readable instructions to:

initiate, at a first time, the lane change to a target section in the second lane in response to determining that no vehicle is present on the target section and that no vehicle is present on a target road shoulder adjacent to the target section in a direction of the lane change, and delay initiation of the lane change in response to determining that a vehicle is present on the target road shoulder and that no vehicle is present on the target section in the second lane when the lane change is scheduled, and initiate, at a time later than the first time, the execution of the lane change to a section of the second lane that is in front of the target section after the host vehicle has passed the vehicle on the target road shoulder; and cause a direction indicator to display an indication that the lane change is to be made to the second lane before the host vehicle has passed the vehicle on the target road shoulder.

7. A vehicle control device comprising:

a non-transitory storage medium storing computer-readable instructions; and at least one processor connected to the storage medium, wherein the processor executes the computer-readable instructions to:

recognize a surrounding situation of a host vehicle;

cause the host vehicle to make a lane change from a first lane in which the host vehicle is traveling to a second lane adjacent to the first lane by controlling steering of the host vehicle based on the surrounding situation, wherein, to cause the host vehicle to make the lane change, the processor executes the computer-readable instructions to;

initiate, at a first time, execution of the lane change to a target section in the second lane in response to determining that no vehicle is present on the target section and that no vehicle is present on a target road shoulder adjacent to the target section in a direction of the lane change;

execute the lane change after notifying an occupant of the host vehicle of the lane change to be made via a notification device; and delay initiation of the execution of the lane change in response to determining that a vehicle is present on the target road shoulder and that no vehicle is present on the target section, and initiate, at a time later than the first time, the execution of the lane change to a section of the second lane that is in front of the target section after the host vehicle has passed the vehicle on the target road shoulder, wherein the target section is a section in a proceeding direction of the host vehicle from a position of the host vehicle at a time at which the notification is scheduled to a position of the host vehicle at a time at which the lane change is scheduled to be completed when no vehicle is present on the target road shoulder and no vehicle is present on the target section in the second lane when the lane change is scheduled.

8. A vehicle control device comprising:

a non-transitory storage medium storing computer-readable instructions; and at least one processor connected to the storage medium, wherein the processor executes the computer-readable instructions to:

recognize a surrounding situation of a host vehicle;

cause the host vehicle to make a lane change from a first lane in which the host vehicle is traveling to a second lane adjacent to the first lane by controlling steering of the host vehicle based on the surrounding situation, wherein, to cause the host vehicle to make the lane change, the processor executes the computer-readable instructions to:

initiate, at a first time, execution of the lane change to a target section in the second lane in response to determining that no vehicle is present on the target section and that no vehicle is present on a target road shoulder adjacent to the target section in a direction of the lane change;

execute the lane change after causing a direction indicator to display that the lane change is to be made to the second lane; and delay initiation of the execution of the lane change in response to determining that a vehicle is present on the target road shoulder and that no vehicle is present on the target section, and initiate, at a time later than the first time, the execution of the lane change to a section of the second lane that is in front of the target section after the host vehicle has passed the vehicle on the target road shoulder, wherein the target section is a section in a proceeding direction of the host vehicle from a position of the host vehicle at a time at which the direction indicator is scheduled to be caused to display a lane change to be made to the second lane to a position of the host vehicle at a time at which the lane change is scheduled to be completed when no vehicle is present on the target road shoulder and no vehicle is present on the target section when the lane change is scheduled.

9. A vehicle control device comprising:

a non-transitory storage medium storing computer-readable instructions; and at least one processor connected to the storage medium, wherein the processor executes the computer-readable instructions to:

recognize a surrounding situation of a host vehicle;

cause the host vehicle to make a lane change from a first lane in which the host vehicle is traveling to a second lane adjacent to the first lane by controlling steering of the host vehicle based on the surrounding situation, wherein, to cause the host vehicle to make the lane change, the processor executes the computer-readable instructions to;

initiate, at a first time, execution of the lane change to a target section in the second lane in response to determining that no vehicle is present on the target section and that no vehicle is present on a target road shoulder adjacent to the target section in a direction of the lane change; and delay initiation of the execution of the lane change in response to determining that a vehicle is present on the target road shoulder and that no vehicle is present on the target section in the second lane when the lane change is scheduled, and initiate, at a time later than the first time, the execution of the lane change to a section of the second lane that is in front of the target section after the host vehicle has passed the vehicle on the target road shoulder, wherein the target section is a section in a proceeding direction of the host vehicle from a position of the host vehicle at a time at which the host vehicle is scheduled to come into contact with a division line of the second lane to a position of the host vehicle at a time at which the lane change is scheduled to be completed when no vehicle is present on the target road shoulder and no vehicle is present on the target section when the lane change is scheduled.

10. A vehicle control method, comprising recognizing a surrounding situation of a host vehicle;

causing the host vehicle to make a lane change from a first lane in which the host vehicle is traveling to a second lane adjacent to the first lane by controlling steering of the host vehicle based on the surrounding situation, wherein the causing comprises:

initiating, at a first time, execution of the lane change to a target section in the second lane in response to determining that no vehicle is present on the target section and that no vehicle is present on a target road shoulder adjacent to the target section in a direction of the lane change; and delaying initiation of the execution of the lane change in response to determining that a vehicle is present on the target road shoulder and that no vehicle is present on the target section, and initiating, at a time later than the first time, the lane change to a section of the second lane that is in front of the target section after the host vehicle has passed the vehicle on the target road shoulder; and notifying an occupant of the host vehicle of the lane change to be made via a notification device before the host vehicle has passed the vehicle on the road shoulder.

11. A non-transitory computer storage medium storing a program for causing a computer to perform operations, the operations comprising:

recognizing a surrounding situation of a host vehicle;

causing the host vehicle to make a lane change from a first lane in which the host vehicle is traveling to a second lane adjacent to the first lane by controlling steering of the host vehicle based on the surrounding situation, wherein the causing comprises:

initiating, at a first time, execution of the lane change to a target section in the second lane in response to determining that no vehicle is present on the target section and that no vehicle is present on a target road shoulder adjacent to the target section in a direction of the lane change; and delaying initiation of the execution of the lane change in response to determining that a vehicle is present on the target road shoulder and that no vehicle is present on the target section, and initiating, at a time later than the first time, the execution of the lane change to a section of the second lane that is in front of the target section after the host vehicle has passed the vehicle on the target road shoulder; and notifying an occupant of the host vehicle of the lane change to be made via a notification device before the host vehicle passes the vehicle on the road shoulder.

* * * * *